(12) United States Patent
Caneer

(10) Patent No.: US 9,393,657 B2
(45) Date of Patent: *Jul. 19, 2016

(54) DEBRIS EVACUATOR FOR CLEANING A MASONRY BORE

(71) Applicant: Hadley H. Caneer, Huntington Beach, CA (US)

(72) Inventor: Hadley H. Caneer, Huntington Beach, CA (US)

( * ) Notice: Subject to any disclaimer, the term of this patent is extended or adjusted under 35 U.S.C. 154(b) by 544 days.

This patent is subject to a terminal disclaimer.

(21) Appl. No.: 13/774,567

(22) Filed: Feb. 22, 2013

(65) Prior Publication Data

US 2014/0238684 A1 Aug. 28, 2014

(51) Int. Cl.
*B08B 5/04* (2006.01)
*A47L 9/10* (2006.01)
*B23Q 11/00* (2006.01)

(52) U.S. Cl.
CPC .............. *B23Q 11/006* (2013.01); *A47L 9/10* (2013.01); *B08B 5/04* (2013.01); *Y02P 70/171* (2015.11)

(58) Field of Classification Search
CPC ............ E21B 37/00; B08B 5/04; A47L 9/10; B23Q 11/006
USPC ................... 166/311; 175/209, 210, 211, 213
See application file for complete search history.

(56) References Cited

U.S. PATENT DOCUMENTS

| | | | |
|---|---|---|---|
| 2,122,517 A * | 7/1938 | Curtis | B23Q 11/006 173/60 |
| 2,329,330 A | 9/1943 | Brailey | |
| 3,131,947 A | 5/1964 | McCarty | |
| 3,498,674 A * | 3/1970 | Matthews | 175/209 |
| 3,638,737 A * | 2/1972 | Moates | 175/213 |
| 3,655,001 A | 4/1972 | Hoffman | |
| 3,800,890 A | 4/1974 | Gyongyosi | |
| 4,036,308 A | 7/1977 | Dellenberg | |
| 4,100,982 A * | 7/1978 | Wilkinson et al. | 175/206 |
| 4,434,861 A * | 3/1984 | Howeth | 175/66 |
| 4,889,196 A * | 12/1989 | Johnston | 175/209 |
| 4,921,375 A | 5/1990 | Famulari | |
| 5,653,561 A | 8/1997 | May | |
| 8,381,841 B2 * | 2/2013 | Caneer | 175/213 |
| 2002/0104687 A1 | 8/2002 | Bongers-Ambrisius | |
| 2003/0000749 A1 | 1/2003 | Tessier | |
| 2003/0111266 A1* | 6/2003 | Roach | 175/57 |
| 2007/0243031 A1 | 10/2007 | Yun | |
| 2010/0000796 A1 | 1/2010 | Boeck | |

* cited by examiner

*Primary Examiner* — Frederick L Lagman
(74) *Attorney, Agent, or Firm* — Fulwider Patton LLP

(57) ABSTRACT

A fitting having a cover tube connected to one end and a pressure line in the fitting, connected to a rigid tube projecting from the fitting and through the cover tube. The method includes projecting a rigid tube in a masonry bore, and applying pressurized air to blow debris from the bore to be captured in a cover tube.

6 Claims, 3 Drawing Sheets

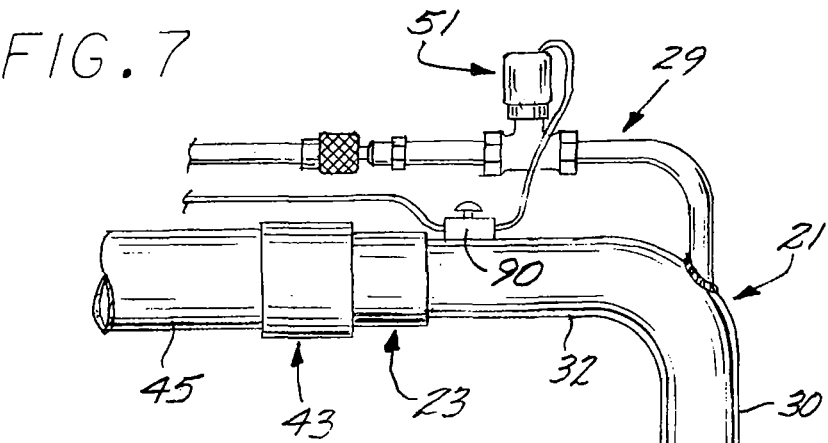
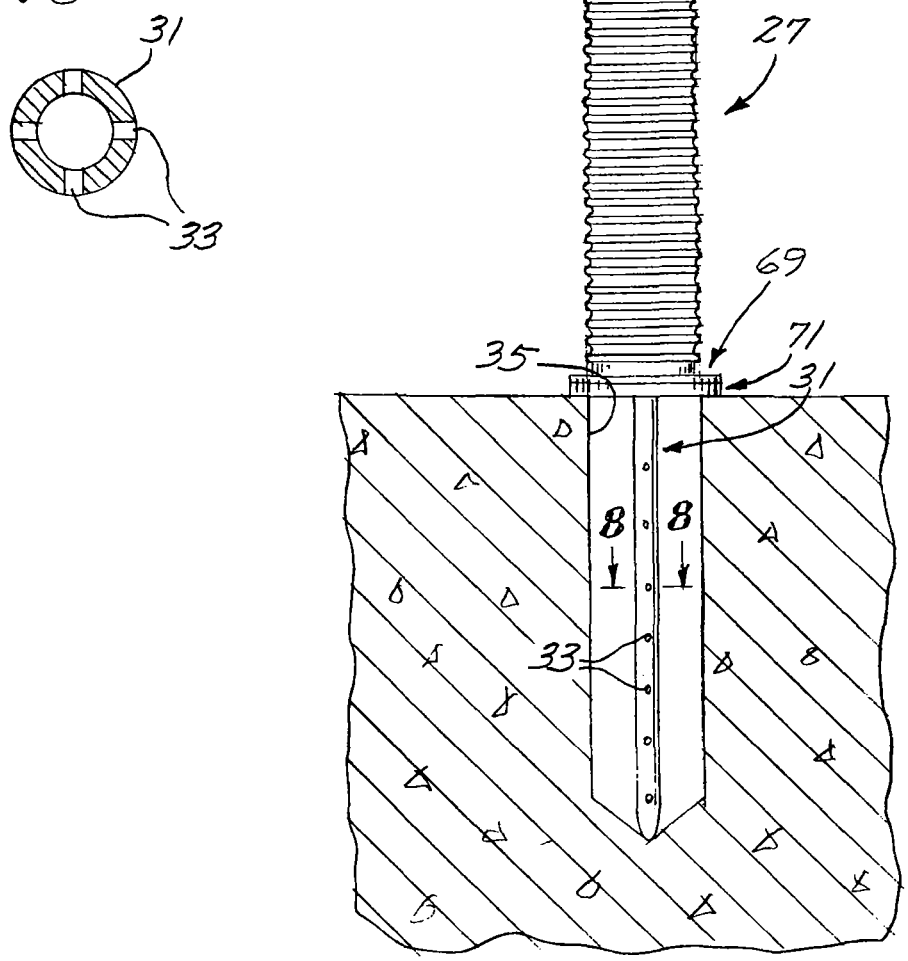

DEBRIS EVACUATOR FOR CLEANING A MASONRY BORE

This application is a continuation of U.S. application Ser. No. 13/872,508 which was filed May 18, 2010, now U.S. Pat. No. 8,381,841.

BACKGROUND

Device for cleaning bore holes.

1. Field of the Invention

The present invention relates to construction tools and particularly to device for cleaning debris from a bore built in concrete.

2. Description of the Prior Art

In construction and remodeling the occasion frequently arises for inserting reinforcement and anchoring dowels which typically requires drilling of bores in concrete foundational or structural side walls. Debris must then be cleaned from the bores for insertion of the dowels and a bonding such as epoxy. This typically involves the insertion of a nozzle or the like in the bore and for the application of high pressured air to swirl the dust and debris about the bore and elevate the particles and chunks by the flow stream generated by high pressure air. This then typically involves release of robust plumes of dust and debris to the atmosphere thus resulting in discomfort and health hazards to the workman on site and, as the dust and dirt settles, coated walkways and a generally untidy and dangerous workplace.

In other areas of the art, efforts have been made to vacuum dust from a masonry drill bit as by utilizing a hollow drill bit and connecting a flex hose to a vacuum pump. A device of this type is shown in U.S. Pat. No. 3,131,947 to McCarty. Such devices require relatively expensive customized drill bits and manifolding arrangements and, in any event, can be rather ineffective in their application.

Similar problems have been encountered in procedures involving large diameter earth drills wherein efforts have been made to manifold the drill bit and pressurize down hole, purportedly to drive drillings to the earth's surface. A device of this type is shown U.S. Pat. No. 3,655,001 to Hoffman.

Other efforts have been to control dust from a down hole drill bit and have led to a proposal that manifolding be divided down hole for applying high pressure air to drive dust and debris from the hole. Devices of this type are shown in U.S. Pat. No. 3,800,890 to Gyongyosi et al.

Other work has been undertaken in the area of hand drills wherein hollow drill bits covering a boot have been proposed. As an example, U.S. Pat. No. 4,036,308 to Dellenberg shows a hollow bit with manifolding for compressed air. U.S. Pat. No. 5,653,561 to May shows a axially collapsible boot for connection on one end with a drill chuck and constructed to coaxial with a drill bit and house swarf from the working bit.

U.S. Patent Application Publication No. US2002/0104687 published Aug. 8, 2002 to Boners-Ambrosius et al. addresses problems with debris from a masonry drill bit for installing dowels but his solution again relied on hollow drill bits and manifolding.

Other efforts to address the debris from drill bit swarfing has led to the proposal of a multi-chamber collection device coupled with a longitudinally compressible tube through which a drill bit might extend. A device of this type is shown in U.S. Patent Application Publication 2007/0243031, published Oct. 18, 2007 to Yun.

Other features and advantages of the invention will become apparent from the following detailed description, taken in conjunction with the accompanying drawings which illustrate, by way of example, the features of the invention.

SUMMARY OF THE INVENTION

The present invention includes a fitting for connection on one end with a longitudinally compressible cover tube to assume variable lengths allowing a pressure tube to project from the distal end thereof for delivering high pressure air to a blind masonry bore to remove debris and dust therefrom.

A method of using the device involves pressing the cover tube to project the pressure tube into the bore and applying air pressure to flow the airborne debris out the fitting.

BRIEF DESCRIPTION OF THE DRAWINGS

FIG. 7 is a front view similar to FIG. 4 but depicting a pressure tube projecting into the masonry bore; and FIG. 8 is a transverse sectional view, in enlarged scale, taken along the line 8-8 of FIG. 7.

DETAILED DESCRIPTION OF THE PREFERRED EMBODIMENTS

Figure 1:
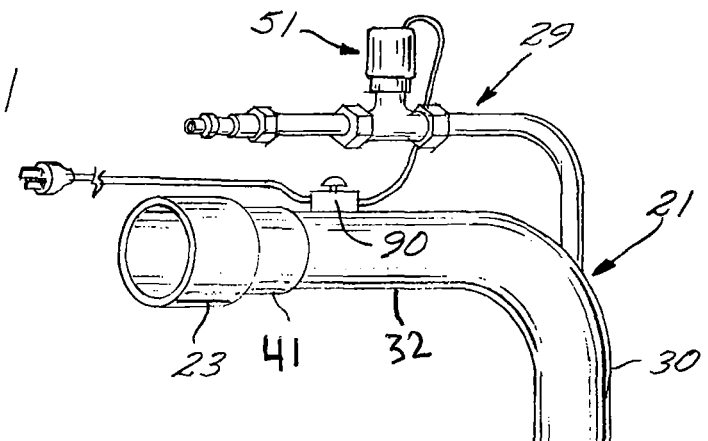
FIG. 1 is a front view of a cleaning device embodying the present invention.
Figure 2:
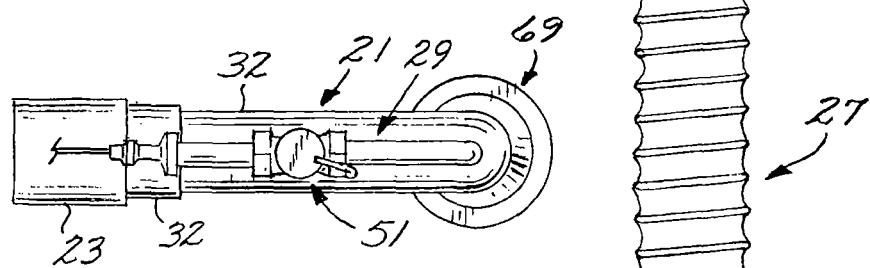
FIG. 2 is a top plan view thereof.
Figure 3:
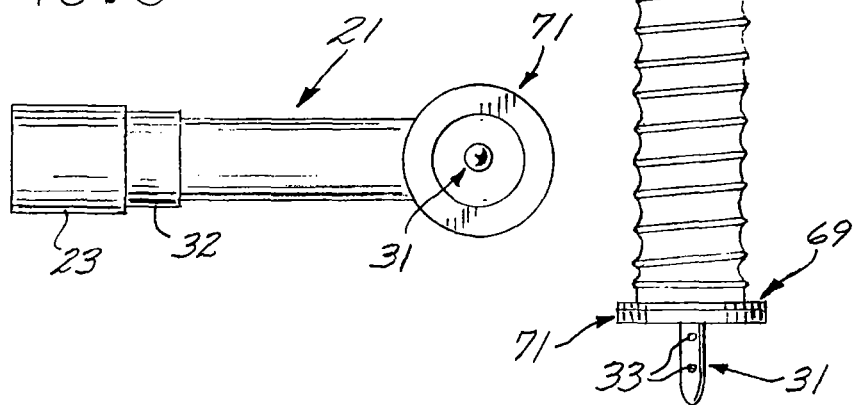
FIG. 3 is a bottom plan view thereof.
Figure 4:
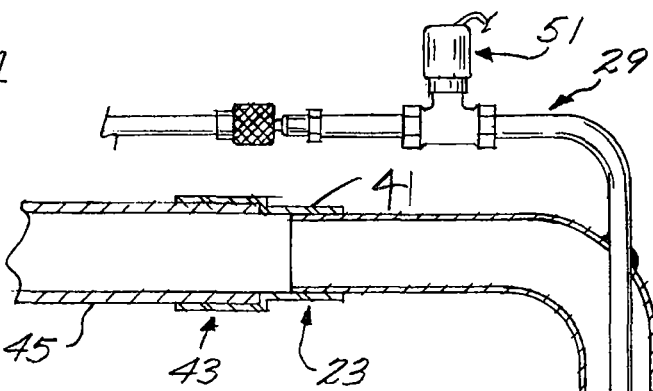
FIG. 4 is a view, similar to FIG. 1 but partially broken away and depicting the device positioned for cleaning a masonry bore.

Referring to FIGS. 1 and 4, the bore cleaning device of the present invention includes, generally, a fitting 21 which may be elbow shaped and is constructed at one end with a vacuum coupling 23 and connected with one end of a contractible cover tube 27. Connected with the fitting 21 is a pressure line, generally designated 29, which joins interiorly with one end of a pressure tube 31 configured in its distal side wall with openings 33 for release of high pressure air in a masonry bore 35 (FIG. 4). Thus, the vacuum coupling 23 may be coupled with a vacuum pump, the pressure line 29 with a compressor and the tube 27 abutted at its distal end over the bore 35 as shown in FIG. 4 and compressed to project the pressure tube 31 into the bore as shown in FIG. 7 to elevate the pressure in such bore while a vacuum is drawn to cooperate in drawing dust and debris from such bore and upwardly through the fitting and to a filtration system coupled with a vacuum pump.

In the preferred embodiment, the fitting 21 is constructed of 2½ inch rigid wall stainless steel and is formed at the one extremity with the slip fit vacuum coupling 23 which receives a friction fit skirt 41 of a collar, generally designated 43, connected with the end of a vacuum hose 45 (FIG. 4).

Figure 5:
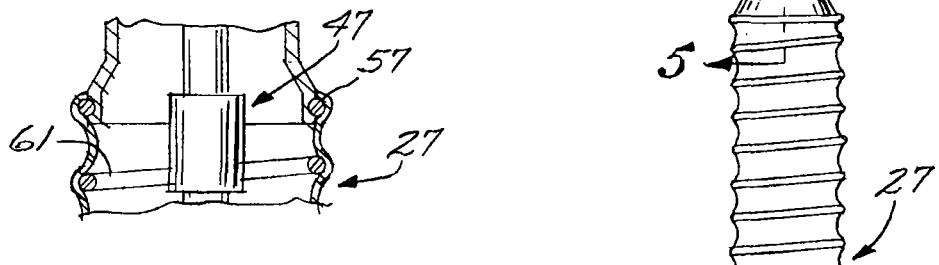
FIGS. 5 and 6 are partial vertical sectional views, in enlarged scale, taken along the lines 5-5 and 6-6, respectively.
Figure 6:
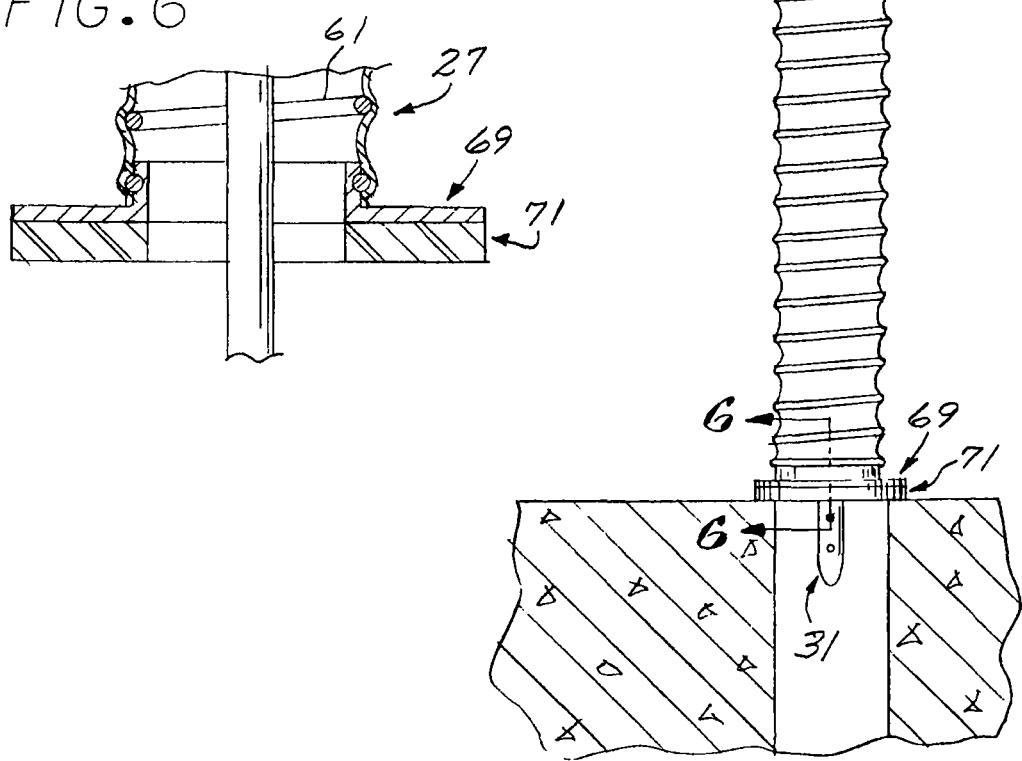

The preferred embodiment, the vacuum line 29 may also be constructed of stainless steel and is configured to pass through the wall of the fitting 23 as shown in FIG. 4 to be formed on its lower extremity with an internally threaded collar 47 for threadable receipt of the externally threaded proximal extremity of the pressure tube 31 (FIG. 5).

In one preferred embodiment, the pressure line 29 includes a control valve, depicted for illustrative purposes as a solenoid valve, generally designated 51, and which may, in some embodiments, be connected in an electrical circuit with the control for the vacuum pump (not shown) and with a control panel 90 so that the vacuum and pressure valves are controlled simultaneously. In some embodiments I substitute a manual valve for the solenoid valve.

The lower extremity of the fitting 21 is expanded outwardly to form a bell collar 57 (FIG. 5) configured in its periphery with an annular, outwardly opening groove-receiving a connector ring 59 which serves to connect the upper extremity of the cover tube 27 with such fitting.

The tube 27 may be constructed with a flexible wall and, in the preferred embodiment, incorporates a coil spring 61 disposed therein in spiral fashion to be received bellows formed by a spiral shaped convolution 65 in the wall of such tube to thereby give the tube some body and provide for a memory which tends to maintain the tube disposed in a linear axial position and which will, without undue force, allow the tube to be compressed a distance sufficient to allow the distal extremity of the pressure tub 31 to be projected nearly to the blind end of the bore 35 as shown in FIG. 7.

In the preferred embodiment, the extremity of the free tube 27 includes an annular flange, generally designated 69, which mounts on the distal side thereof an annular compressible seal 71 for mating in sealing engagement with the surface in which the bore 35 is formed.

Conveniently, a workman may grasp the transverse hand hold run 32 and compress the tube 27 axially to contract the bellows therein thus projecting the pressure tube 31 distally into the bore 35 to the position shown in FIG. 7 so that the orifices 33 will be spaced along the axial length of the bore and extending adjacent the blind end of such bore so that upon actuation of the solenoid valve 51 to pressurize the tube, high pressure and high speed air will be forced from the tube to generate a high pressure turbulent flow at the blind end of such bore to thereby carry debris and dust within such bore upwardly in the air flow so that the debris is maintained airborne as the vacuum pump draws a vacuum in the vacuum tube 45 to thereby enhance the pressure differential along the length of the cover tube 27 to thus facilitate air flow through such tube and out the fitting 21 into the vacuum tube 45 to be carried to a filtration system (not shown) for filtering thereof. In practice, it has been my experience that the device of the present invention will clean a conventional masonry bore in just a minute or so, thus providing efficient and effective evacuation of dust and debris, holding it captive in the air flow stream as the conveying flow stream progresses from the bore 35 upwardly through the cover tube 27 through the fitting 21 and into the vacuum tube. This then helps maintain the atmosphere free of the dust and debris, to provide a healthy and safe work environment. In some applications, the controls for the vacuum pump and for the solenoid valve 51 are connected to a control panel 90 which will allow the operator to operate both the pump and valve simultaneously.

As will be appreciated from the foregoing, the bore cleaning device of the present invention provides an economical and convenient means for efficient and rapid cleaning of a masonry bore while protecting the workman from the dust and particles being evacuated thereby produce a clean and healthy working environment.

I claim:

1. A masonry bore cleaning device for cleaning a bore extending through a surface and comprising:
    an L-shaped fitting including a tube having first and second extremities;
    a vacuum coupling on the first extremity;
    an elongated cover tube connected to the second extremity and projecting distally therefrom to terminate in a free extremity, the cover tube being longitudinally collapsible from an extended to a retracted position and being biased to the extended position;
    an elongated pressure tube fixed on one end to the tube and projecting through the cover tube and cooperating therewith to form a longitudinal annulus and terminating at a distal extremity, the pressure tube including at least one opening near the distal extremity whereby a workman may grasp the fitting, abut the free extremity against the surface around the bore and press the fitting toward the surface to compress the cover tube longitudinally to cause the distal extremity of the pressure tube to project distally into the bore so that high pressure air may be introduced through the opening in the pressure tube to force high pressure air out of the opening while a partial vacuum is applied through the coupling to generate a pressure differential in the annulus to drive any debris from the bore through the annulus and out the coupling.

2. The cleaning device of claim 1 that includes:
a spring biasing the tube to the extended position.

3. A method of cleaning debris from a masonry bore extending a selected depth from a masonry surface and including:
    selecting a fitting including a rigid tubular elbow having first and second extremities and an elongated pressure tube fixed in the tubular elbow and projecting to an opening near the second extremity and an elongated cover tube received longitudinally over the pressurization tube to cooperate in forming an annulus and terminating in a free extremity;
    abutting the first extremity against the surface;
    projecting the pressure tube into the bore while collapsing the cover tube;
    biasing the cover tube against the masonry surface;
    applying a vacuum to the first extremity; and
    applying a pressure to the pressure tube to apply high pressure through the opening into the bore to cooperate with the vacuum to create a pressure differential along the bore and flow air and debris through the annulus to the vacuum outlet.

4. The method of claim 3 that includes:
biasing the cover tube against the surface.

5. The method of claim 3 that includes:
selecting the cleaning device with the cover tube concentric about the pressurization tube to form an annulus.

6. The method of claim 3 that includes:
sealing the free extremity to the surface.

* * * * *